United States Patent
DeGuiseppi et al.

(10) Patent No.: US 6,709,493 B2
(45) Date of Patent: Mar. 23, 2004

(54) DEVICE FOR REDUCING THE PRESENCE OF MOISTURE WITHIN AN ENCLOSURE CONTAINING A HEAT SOURCE

(75) Inventors: David T. DeGuiseppi, Chadds Ford, PA (US); Kerry L. DeWitt, Wilmington, DE (US); Amy Elizabeth Johnson, Cordova, TN (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/105,952

(22) Filed: Mar. 25, 2002

(65) Prior Publication Data

US 2002/0170437 A1 Nov. 21, 2002

Related U.S. Application Data

(60) Provisional application No. 60/278,608, filed on Mar. 26, 2001.

(51) Int. Cl.[7] .......................... B01D 53/26; F21V 31/03
(52) U.S. Cl. .................. 96/7; 96/134; 96/143; 362/294
(58) Field of Search .................... 96/4, 7, 108, 134, 96/143, 147; 55/385.3, 385.6; 362/267, 294, 345

(56) References Cited

U.S. PATENT DOCUMENTS

| | | | | |
|---|---|---|---|---|
| 4,612,607 A | * | 9/1986 | Segoshi et al. | 362/547 |
| 4,739,458 A | | 4/1988 | Yamayoshi et al. | 362/294 |
| 4,750,093 A | | 6/1988 | Bals et al. | 362/80 |
| 4,755,917 A | | 7/1988 | Bals et al. | 362/267 |
| 4,796,163 A | * | 1/1989 | Dressler | 362/547 |
| 4,809,144 A | | 2/1989 | Suzuki | 362/294 |
| 4,830,643 A | | 5/1989 | Sassa et al. | 55/316 |
| 5,116,650 A | | 5/1992 | Bowser | 428/34.2 |
| 5,522,769 A | * | 6/1996 | DeGuiseppi | 454/270 |
| 5,997,614 A | * | 12/1999 | Tuma et al. | 96/4 |
| 6,422,729 B1 | * | 7/2002 | Rohrbach et al. | 362/547 |

FOREIGN PATENT DOCUMENTS

| | | |
|---|---|---|
| DE | 297 10 696 | 8/1997 |
| GB | 1 394 411 | 5/1975 |
| GB | 1 472 189 | 5/1977 |
| GB | 1 547 863 | 6/1979 |
| WO | WO 97/27042 | 7/1997 |
| WO | WO 98/31966 | 7/1998 |
| WO | WO 00/47932 | 8/2000 |

* cited by examiner

*Primary Examiner*—Frank M. Lawrence
(74) *Attorney, Agent, or Firm*—Carol A. Lewis White (57) ABSTRACT

A venting device that reduces the moisture of an enclosure containing a heat source and prevents the entrance of water or other liquids and contamination from entering the enclosure. The moisture reducing device comprises a drying agent or desiccant which is adjacent to said heat source (such as an automotive headlamp bulb or thermally cycling device), an air-impermeable, water-vapor permeable layer, a vent that allows bulk flow of air during thermal cycling of the heat source and a internal diffusion tube or channel that limits the entrance of moisture vapor from the external atmosphere to the drying agent or desiccant. The air-impermeable, water vapor permeable layer allows for continuous diffusion of water vapor, reducing the moisture in the enclosure when the heat source is de-energized. The location of the device to the heat source regenerates the drying agent in the device when the heat source is energized. The device may be in a variety of shapes for ease of placing the device adjacent to the heat source.

25 Claims, 7 Drawing Sheets

DEVICE FOR REDUCING THE PRESENCE OF MOISTURE WITHIN AN ENCLOSURE CONTAINING A HEAT SOURCE

CROSS-REFERENCE TO RELATED APPLICATION

The present application is a regular application based on now abandoned. U.S. Provisional Patent Application No. 60/278,608 filed Mar. 26, 2001.

FIELD OF THE INVENTION

The present invention generally relates to a device for reducing undesirable moisture in enclosures containing a heat source, such as automobile lamps and other electronic enclosures.

BACKGROUND OF THE INVENTION

Many items are susceptible to damage caused by excessive moisture. As used herein, the term "moisture" is intended to refer to water which is diffused or condensed, whether in liquid form or vapor form, from the ambient atmosphere. For instance, electrical and electronic items may be ruined or altered due to excessive moisture. Similarly, enclosed components, e.g., those contained in a housing, that undergo thermal cycling are susceptible to moisture related problems. Examples of enclosures which are subject to undesirable moisture include, for example, automotive headlamp units, electronics contained in enclosed housings, and other systems where on/off cycling of a heat source within an enclosure results in moisture build-up during such thermal cycling. One means of dispensing moisture is to provide greater airflow across, or through, the enclosure. However, when components are located in an enclosed housing it can be very difficult to provide adequate airflow to reduce moisture. For example, attempts to increase the vent opening sizes can exacerbate problems such as contamination, etc.

Another means of managing moisture in an enclosure is to place a drying agent or desiccant within the enclosure. As the terms "desiccants" or "drying agents" are used herein, they are intended to refer to any material which absorbs water vapor from the air and is thereby able to reduce the moisture in the air in enclosed containers.

G.B. Patent No. 1,394,411, entitled "Improvements In Or Relating To Vehicle Headlamps," is directed to an air-impermeable desiccant-filled tube having an opening in one end positioned in the interior of an automotive headlamp, an opening at the other end of the tube with a diffusion damper and/or a throttling device, such as a ceramic plug, and an external diffusion tube or path which allows air from the enclosure to pass while protecting the enclosure against contamination and water splashes.

G.B. Patent No. 1,472,189, entitled "Improvements In Headlamps," teaches an insertable plug which is filled with a hydroscopic agent. The plug has an opening in the interior headlamp and a porous web on the other end which is exposed to the atmosphere. In use, the device is mounted in the headlamp reflector from the exterior of the enclosure.

G.B. Patent No. 1,547,863, entitled, "Lamp For A Motor Vehicle," discloses a moisture reducing device in a pressure equalization passage in the cap or in an element attached to the cap. The invention employs a spiral diffusion channel, hydroscopic sheet and covering cap that protects the hydroscopic sheet from dirt and dust.

U.S. Pat. No. 4,739,458, entitled "Vehicle Lamp Device," discloses a flat, board-like structure that contains a desiccant-filled tube that connects the interior of the lamp to the external atmosphere. Connected to the external end of the desiccant filled tube is a rubber hose that is bent at an acute angle to prevent the direct contact of water drops, dust, mud or the like. In this rubber hose is a permeable plug that prevents contamination and controls the air flow. This patent discloses the use of the heat from the lamp to control the amount of moisture in the enclosure by thermal cycling and the exchange of air through the desiccant.

U.S. Pat. No. 4,755,917, entitled "Headlight for Vehicles, In Particular Motor Vehicles," discloses the use of a desiccant to absorb moisture from the interior of a headlamp. It incorporates a long tube with desiccant chambers located in the interior of the headlamp. The tube as well as the desiccant chambers provides a torturous path for air traveling from the interior to the exterior of the headlamp. The desiccant chambers may be covered on one side with a layer that has a high permeability for water molecules in the mixture of water vapor and air.

U.S. Pat. No. 4,796,163, entitled "Motor Vehicle Headlight," discloses an air exchange device that includes an inlet valve for admitting air into the interior of the headlamp when "under" pressure occurs and another valve which permits air to flow out from the interior of the headlamp into the atmosphere when "over" pressure occurs. The unit is filled with a desiccant that is regenerated by the heat of the lamp.

U.S. Pat. No. 4,809,144, entitled "Vehicle Headlamp With A Venthole," is directed to a headlamp with an internal elongated tube having small openings in the front and rear ends for communications with the interior and exterior environment. The elongated tube is filled with desiccant and may further include air permeable resin films at the interior and exterior openings, with the resin film on the exterior opening having higher permeability than the interior opening film. The desiccant filled tube is located above the lamp of the headlight.

PCT Publication No. WO 97/27042, entitled "Combination Desiccant And Heat Source," is directed to mixing a desiccant with a porous polymer, forming said composite into a shape which can be placed or affixed proximate to a heat source. The device incorporates a shielded vent with an air-permeable membrane.

PCT Publication No. WO 00/47932, entitled "Headlight Assembly Humidity Control System," teaches a device inserted through the wall of the housing which connects the interior of the lamp housing to the exterior atmosphere. Air is exchanged by thermal cycling of the headlamp through the external diffusion channel, desiccant, and air permeable, microporous membrane of the device. The device may be fitted with a further protective cap to shield the air-permeable, microporous hydrophobic membrane from water and other contaminants.

The teachings of the prior art devices described above typically rely on the thermal cycling of the headlamp to reduce moisture through the mechanism of air exchange and are not particularly effective at absorbing moisture from the lamp housing itself, particularly in the case of plastic housings, when moisture is diffusing through or deadsorbing from the housing.

Accordingly, there remains a need in the art for an improved moisture reduction device incorporating a desiccant located within the enclosure adjacent the heat source to absorb and expel moisture from the enclosure while also providing protection against contamination entering the enclosure.

It has been surprisingly discovered that the majority (e.g., greater than about 50%) of moisture in plastic enclosures, such as headlamps, deadsorbs from and diffuses through the plastic housing itself. While moisture does enter an enclosure through vent openings via air exchange during temperature changes, attributed to the on/off cycling of the heat source, it is small in comparison to the amount of water that deadsorbs from and/or diffuses through the plastic housing. For example, it was found that in a plastic enclosure, such as an automobile headlamp, when the heat source is energized the plastic itself deabsorbs moisture both into the enclosure and outside into the surrounding external atmosphere. Conversely, when the energy source is deenergized, the plastic reabsorbs moisture both present in the enclosure and from the external surrounding environment. The change in moisture level can be seen within minutes of the temperature change of the heat source. It was also found that the moisture permeation through the lamp housing occurs over a long time period, from hours to days to weeks, depending on the housing construction, venting device and external ambient environment.

Accordingly, there remains a need in the art for an improved moisture reduction device incorporating a desiccant located within the enclosure adjacent the heat source to absorb and expel moisture from the enclosure while also providing protection against contamination entering the enclosure.

SUMMARY OF THE INVENTION

The present invention is a device for reducing moisture in an enclosed housing containing a heat source, such as a headlamp or other enclosure containing electronics. The invention comprises a housing for holding a desiccant, an air-impermeable, water vapor-permeable layer incorporated with said housing, preferably oriented on a side adjacent the heat source, a vent hole in the housing to provide an air pathway from inside the electronic enclosure, a diffusion tube or channel oriented with the housing to provide a pathway from the desiccant to the external atmosphere outside the electronic enclosure, and a means for positioning the device adjacent the heat source. When the device is disposed adjacent the heat source, the heat generated by the heat source regenerates the desiccant. As used herein, the term "adjacent" means in close proximity sufficient for heat from the heat source to reach the device, preferably oriented in a region of the electronic enclosure generally above the heat source so that heated air from the bulb comes in contact with device.

In a preferred embodiment, the device of the present invention may incorporate one or more components which help to heat the air as it passes through the device. For example, the air-impermeable, water vapor permeable layer may be dark in color to faciliate absoprtion of energy generated by the bulb. Further, optional metal or other thermally conductive components may be incorporated in or with the device to absorb heat and transfer such heat to the air within the device.

The device of the present invention acts to reduce moisture by the transport of air through the device, particularly during thermal cycling of the heat source. When the heat source is energized, the air in the enclosure expands and passes through the desiccant chamber in the moisture reducing device through the vent, whether or not the vent is covered with an air permeable layer. The heated air continues through the device into the diffusion tube or channel. As the temperature rises due to the energy generated by a heat source, the desiccant regenerates (i.e., dries) and releases water vapor into the air which is then expelled into the external atmosphere through the diffusion tube. When the heat source is de-energized (e.g., turned off), the air inside the enclosure cools and contracts, and ambient air is drawn into the enclosure through the device and is dried by the regenerated desiccant. To prevent the entrance of liquids such as water and the like, an air-permeable, liquid water impermeable layer, preferably being a hydrophobic layer or more preferably an oleophobic layer, is placed at the opening of the enclosure where the device is positioned to contact the external atmosphere. A second, air-permeable layer inside the enclosure covering the internal vent opening may optionally be incorporated as well to assist in regulating the flow of air in the device.

DETAILED DESCRIPTION OF THE DRAWINGS

The operation of the present invention should become apparent from the following description when considered in conjunction with the accompanying drawings, in which.

DETAILED DESCRIPTION OF THE INVENTION

Referring now to the drawings, wherein similar reference characters designate corresponding parts thoughout several views, embodiments of the moisture reducing device assembly of the present invention are generally shown in a variety of configurations and dimensions for use in an enclosure with a heat source, such as a headlamp or other electronics enclosure. As should be understood, the present invention is not limited to the embodiments illustrated herein, as they are merely illustrative and can be modified or adapted without departing from the scope of the appended claims.

As the term is used herein, "oleophobic" generally refers to the property of the material to repel or not adsorb oils while allowing the passage of gases, generally determined by an oil rating of 2 or greater as determined by AATCC Test Method 118-1983 ("the AATCC Method").

As the term is used herein, "hydrophobic" generally refers to the property of the material to repel or not adsorb water while allowing the passage of gases, generally determined by an oil rating less than two by the AATCC Method.

Figure 1A:
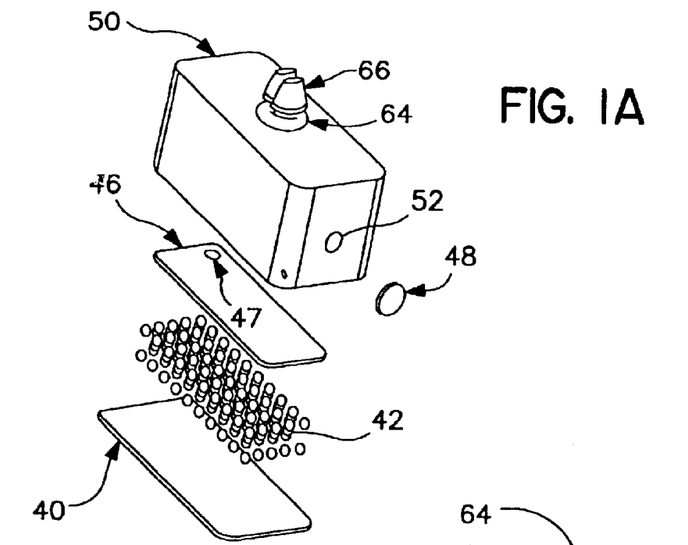
FIG. 1A is an exploded perspective view of one embodiment of a moisture reducing device of the present invention.

FIG. 1A is an exploded perspective view of one embodiment of a moisture reducing device which shows an air-impermeable, water vapor permeable layer 40 attached to a housing 50 containing desiccant 42. Also located on the housing is a vent 52. The size of this vent opening is typically chosen to permit pressure relief when air in the electronic enclosure is heated and expands, but is not so large that desiccant falls out of the housing. Alternatively, as shown in FIG. 1A, a microporous membrane cover 48 may be located over the vent 52. The housing 50 also has a diffusion tube (shown in detail in FIGS. 1B and 1C) and a mechanical attachment mechanism, in this embodiment a split-barbed compression fitting 66 and an o-ring 64.

Figure 1B:
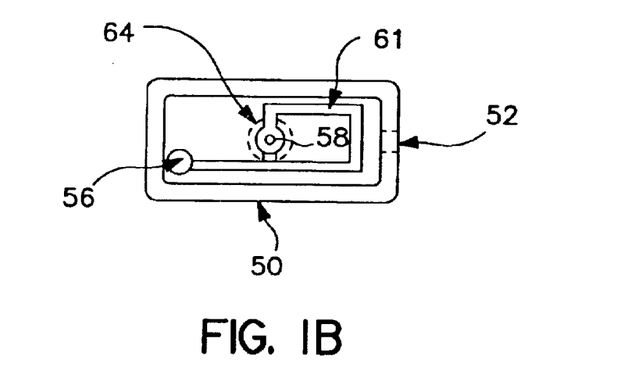
FIG. 1B is an internal perspective view of the housing of the moisture reducing device of FIG. 1A illustrating the internal diffusion tube.
Figure 1C:
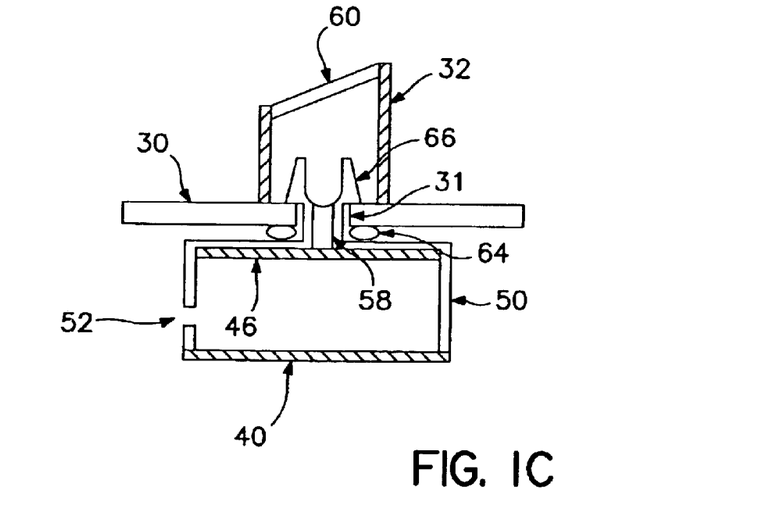
FIG. 1C is a side cross-sectional view of the moisture reducing device of FIG. 1A.

Referring to FIGS. 1B and 1C, shown are an internal perspective view of the housing 50 and a side cross-sectional view, respectively, of the housing showing the diffusion tube and mechanical attachment 66 to the enclosure housing 30. The housing 50 includes a channel 61 incorporated with the housing wall with a first end 56 and a second end aligned with hole 58 through the housing 50. A separation layer 46 is provided having a hole 47 which when placed into the housing aligns with end 56, thereby providing a diffusion channel and path from the desiccant in the housing to the exterior of the electronic enclosure when the device is installed in the enclosure. Installation is carried out by putting the fitting 66 through hole 31 in the enclosure housing 30. The o-ring 64 remains on the interior of the enclosure housing 30. In this embodiment, the air permeable layer 60 is located on an external vent support 32 attached to the enclosure housing 30 with an adhesive (not shown) or other attachment means.

The air-impermeable, water vapor permeable layer may comprise any suitable air-impermeable material, but preferably comprises a silicone imbibed ePTFE membrane.

Suitable materials for the separation layer 46 may include, for example, a pressure sensitive adhesive or a polyester material. The housing may comprise any suitable material such as a metal or a plastic. One preferred plastic material comprises an injection molded or machined polyetherimide housing 50.

The desiccant may include any suitable material, such as $Al_2O_3$, $CaCl_2$, $CaSO_4$, $K_2CO_3$, molecular sieves, $Na_2SO_4$, $ZnCl_2$, activated carbon, silica gel, and the like. The amount of desiccant used may vary depending on, for example, the device, the environment to which the device is exposed, the composition of the desiccant, etc.

The optional vent covering may comprise any suitable microporous membrane, such as an expanded polytetrafluoroethylene (ePTFE).

Figure 2:
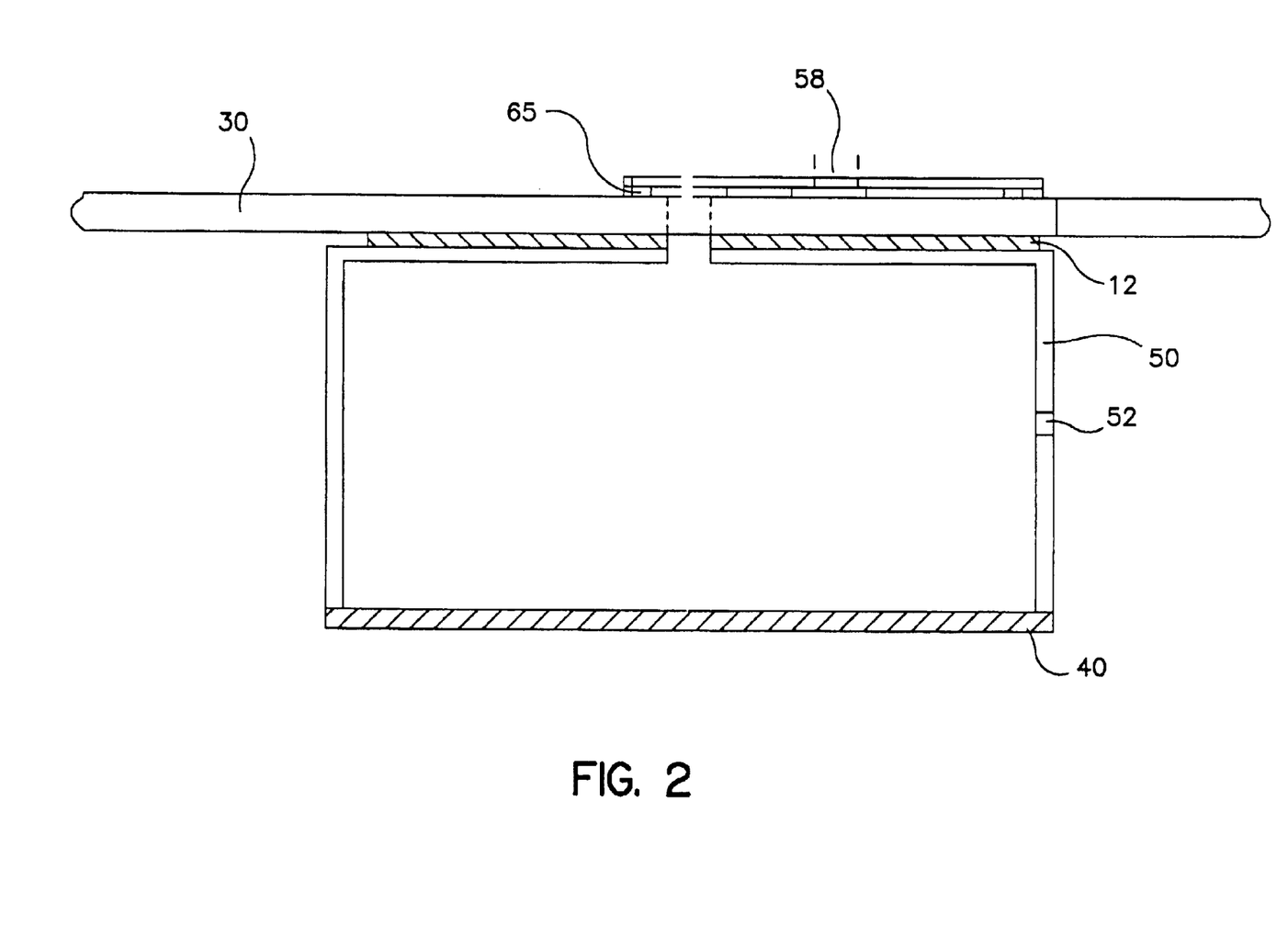
FIG. 2 is a side cross-sectional view of another embodiment of a moisture reducing device having a diffusion tube that passes through and is located exterior to the electronic enclosure.

FIG. 2 is a side cross-sectional view of a moisture reducing device with an external diffusion tube that is created from a series of material layers. The drawing illustrates the housing 50 with a vent hole 52. Also shown is a diffusion tube 65, wherein a channel or pathway is cut through multiple layers to provide a diffusion path to the external atmosphere through hole 58 which connects the external atmosphere to the desiccant (not shown) in the moisture reducing device housing 50. The device housing 50 is attached to the enclosure 30 by an adhesive layer 12, such as a pressure sensitive adhesive. An optional ePTFE membrane layer may be used to cover the hole 52 when desirable. Air impermeable, water vapor permeable layer 40 is located on the device housing 50, as shown.

Figure 3:
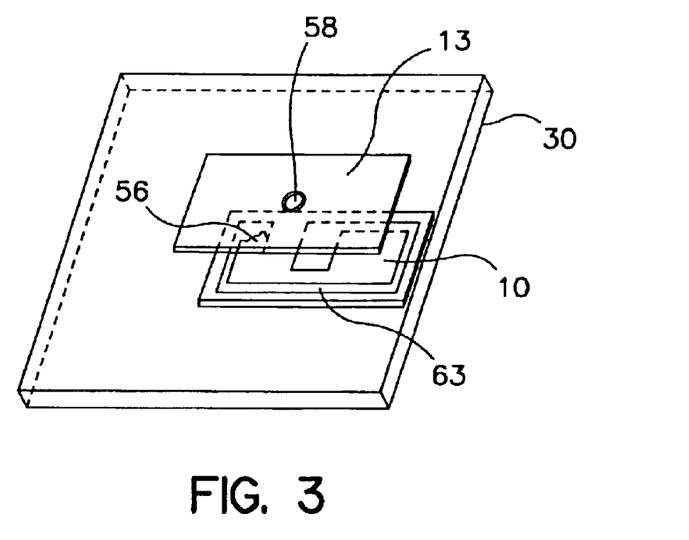
FIG. 3 is a top perspective exploded view of the diffusion tube for the moisture reducing device of FIG. 2.

FIG. 3 is a top exploded partial perspective view of the external diffusion tube of FIG. 2. The Figure illustrates the layers forming the diffusion tube or channel wherein an adhesive layer 10 is cut out to provide a path or channel 63 from the opening 58 in the layer 13 to the opening 56 into the interior of the device.

In the selection of the aforementioned materials, consideration must be made for the moisture reducing device's intended application. The materials should be selected so that they can withstand the temperature of the heat source. Consideration should also be made in the selection of the air-impermeable layer and venting cover materials. For example, vents that incorporate microporous materials such as ePTFE membranes (e.g., GORE-TEX® membrane vents, manufactured by W. L. Gore and Associates, Inc., Elkton, Md.), modified acrylic copolymer membranes (VERSAPOR® R membranes, manufactured by Gelman Sciences, Ann Arbor, Mich.), modified polyvinylidene fluoride (DURAPEL® membranes, manufactured by the Millipore Corporation, Bedford, Mass.) and other microporous materials that are commonly used to relieve pressure from enclosures within a heat source have been proven to be very effective means of preventing liquid water entry and entry of foreign materials into the enclosure.

Figure 4A:
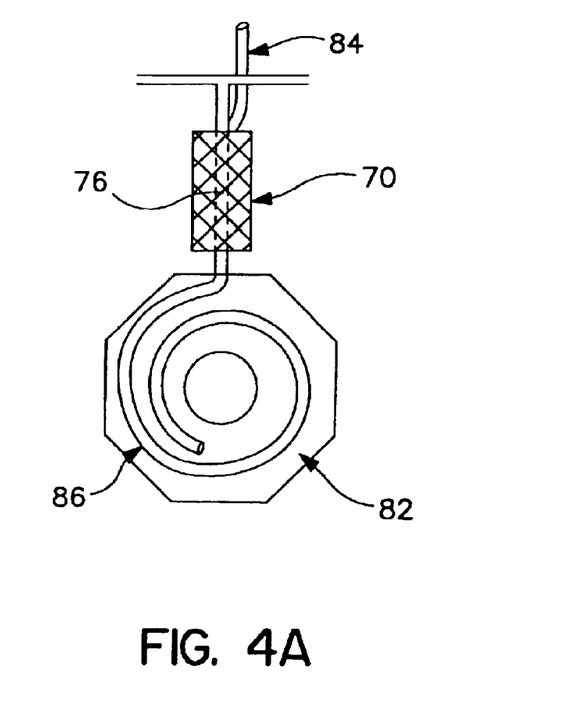
FIG. 4A is a perspective view of an alternative embodiment of a moisture reducing device of the present invention attached to a headlight bulb shield.

FIG. 4A is a perspective view of a further embodiment of the moisture reducing device of the present invention from the "bulb" view of the lamp, wherein the device is attached to a headlight bulb shield 82. The drawing illustrates the bulb shield assembly 82, the moisture reducing device 70 with the air impermeable membrane 76 facing forward, the diffusion tube 84 bent slightly to exit the headlamp enclosure (not shown) and an internal air entry vent tube 86 that connects the interior of the enclosure to the moisture reducing device.

Figure 4B:
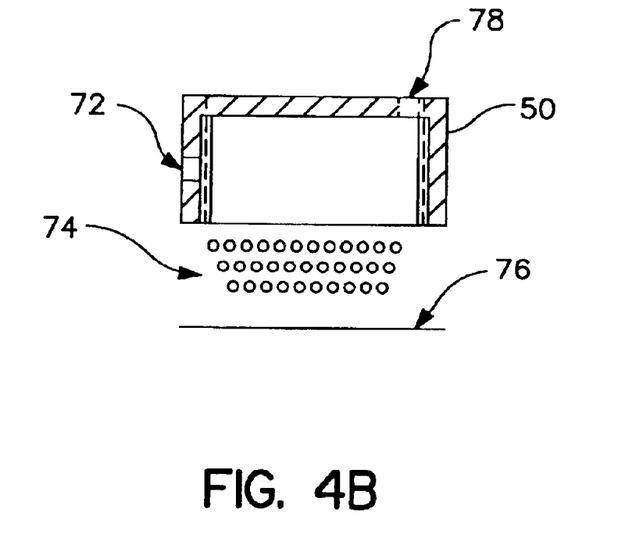
FIG. 4B is an exploded side cross-sectional view of the housing for the device shown in FIG. 4A.

FIG. 4B is an exploded cross-sectional view of the housing 50 of the moisture reducing device of FIG. 4A. The Figure illustrates the housing 50 that contains a vent hole 72 in the side of the housing. Inside the housing 50 is the desiccant 74, which is covered by the air impermeable, water vapor permeable layer 76.

Figure 4C:
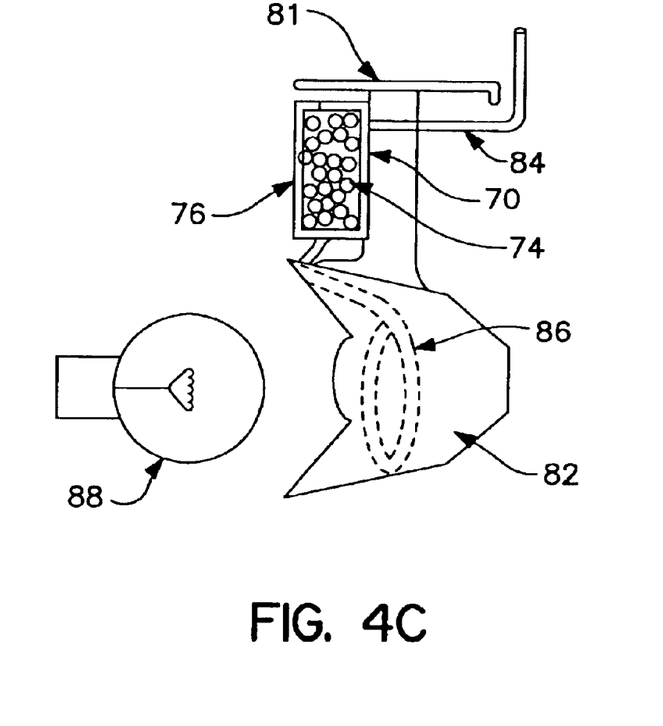
FIG. 4C is a side cross-sectional view of the moisture reducing device of FIG. 4A.

FIG. 4C is a side cross-sectional view of the moisture reducing device of FIGS. 4A and 4B. This figure illustrates the air impermeable, moisture-vapor permeable layer 76, housing 70 which is attached to the stem 81 of the bulb shield 82. Also shown are the desiccant 74 within the housing, the diffusion tube bent into a "L" shape 84 which exits the headlamp enclosure, the internal air entry vent tube 86 that connects the interior of the enclosure to the moisture reducing device, and the bulb 88.

Figure 5A:
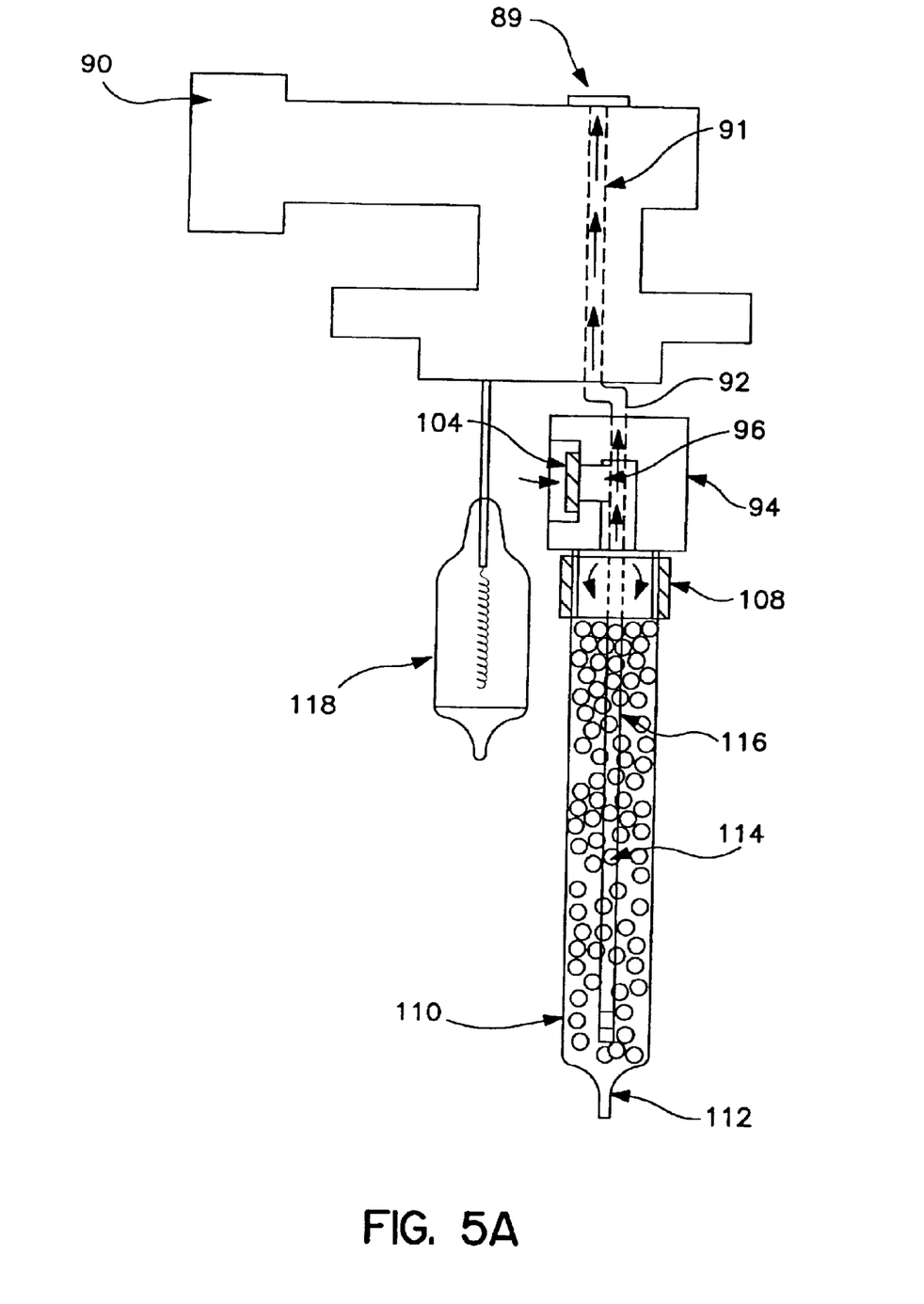
FIG. 5A is a side perspective view of a moisture reducing device of the present invention attached to a headlamp bulb assembly.

FIG. 5A is a side cross-sectional view of another embodiment of a moisture reducing device of the invention in which the device is attached to a headlight bulb socket which illustrates a bulb 118, socket 90 that has been drilled out with a port 91 for the diffusion tube 92 that connects to the moisture reducing device connector 94. The opening of the port 91 is covered with an air permeable adhesive vent 89. The connector 94 (see FIG. 5B), is connected to an air-impermeable, moisture-vapor permeable tube 110, comprising a silicone-imbibed material in this case, attached to the connector 94 by a clamp 108. The end 112 of the silicone-imbibed tube 110 is sealed. The interior of the tube contains desiccant 114 and a diffusion tube 116 that passes through the port 102 (FIG. 5B) in the connector 94. The connector 94 has a port 96 that is covered with an air permeable layer 104.

Figure 6:
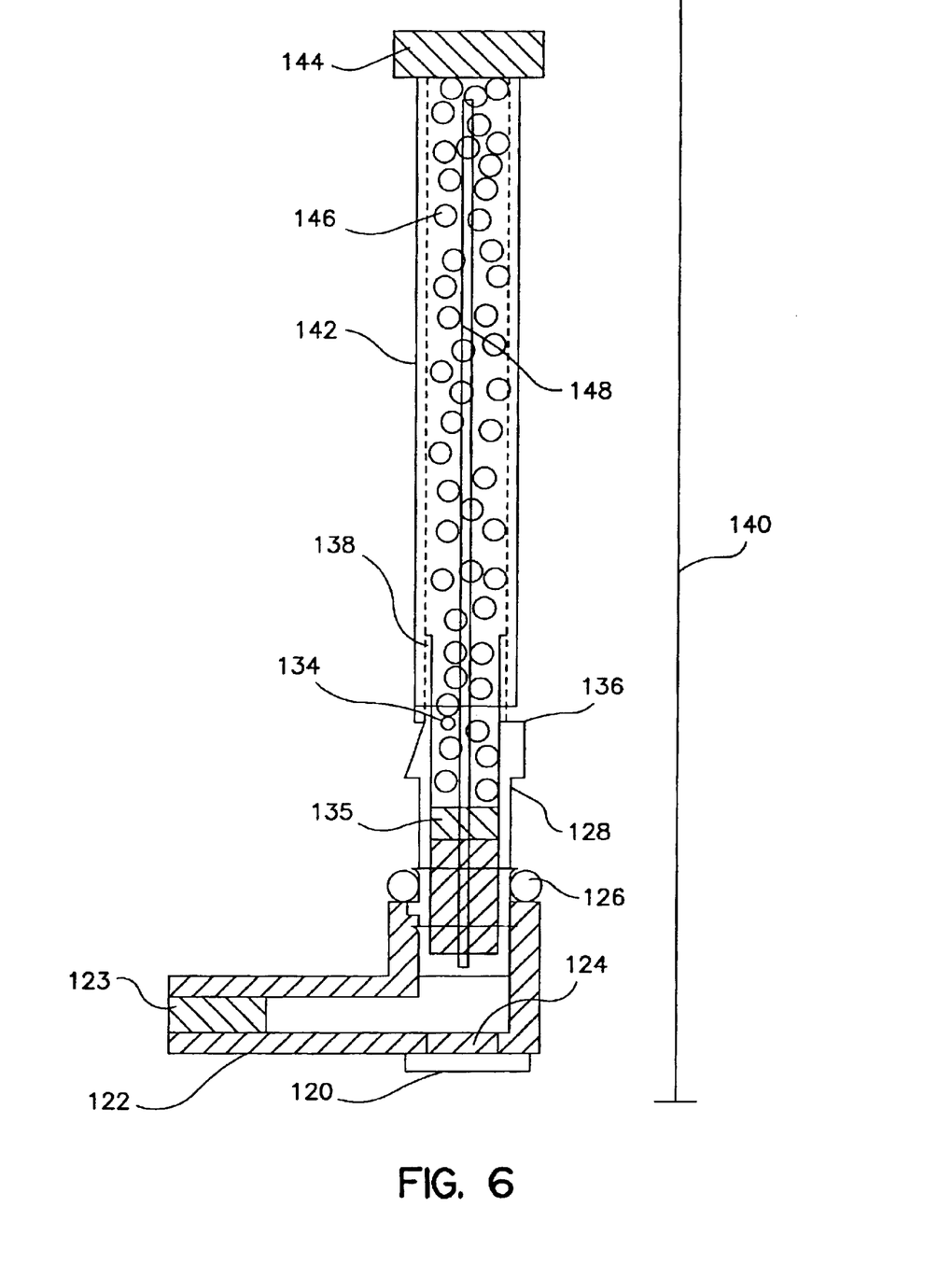
FIG. 6 is a side cross-sectional view of another embodiment of a moisture reducing device of the present invention.

FIG. 6 is a side cross-sectional view of an alternative moisture reducing device 140. Connector 128 is a mechanism for attaching the device 140 to the lamp housing (not shown). An internal vent 134 is located in the connector 128. The cap of the connector 122 has a hole 124 with an air permeable layer 120 covering the hole. The hole 123 of the cap 122 is sealed. A diffusion tube 148 is cut to length and fitted with a plug 135 and attached to the connector 128. The connector 128 has a locking hub 136 and an o-ring 126 that seals the connector 128 into the housing of the headlamp (not shown). A tube 142 comprising an air-impermeable, moisture vapor permeable material which is sealed on one end 144 contains desiccant 146. The tube 142 is sealed over the end of connector 138.

TEST METHODS (1) Test Procedure for Determining the Moisture Vapor Transmission Rate (MVTR) of Test Samples at Room Temperature The test is generally described in ASTM E96-00, "Standard Test Methods for Water Vapor Transmission of Materials," and the MVTR was determined as follows. A 473 ml clear, wide-mouth glass jar with a 8.89 cm diameter lid with PTFE lid liner, supplied by the Cole-Palmer Instrument Company, part number U-99535-43, is used as the test vessel. A 6.35 cm diameter hole is cut into the center of the lid.

An adhesive comprising a polyester carrier having silicone pressure sensitive adhesive on both sides is cut to the following dimensions: OD 7.62 cm×I.D. 6.48 cm. A test specimen is cut into a 7.62 cm diameter disk. The jar lid is cleaned with isopropanol (IPA) and allow to dry. The adhesive ring is placed onto the outside of the lid. The test specimen is placed onto the adhesive ring and pressure is applied to ensure a seal of test sample to lid. The lid is heated to 45° C. for 1 hour to promote adhesive sealing. The lid is removed from the oven and finger pressure is applied to ensure a seal of membrane to lid. The lid is allowed to sit for a minimum of 12 hours to ensure adhesive and test sample are sealed. Duplicates of each test sample are tested.

About 250.0±0.1 grams of Type A silica gel desiccant are weighed (manufactured by Kaltron Inc. (Kaltron/Pettibone) of Bensenville, Ill., part number Sil 66300). The jars and desiccant are placed into 200° C. hot air oven for 4.0 hours to dry the desiccant. The jars are then removed from the oven and cooled on a bench until the temperature is 30° C.

The lids with the sealed test samples are installed on the jars. The weight of each jar with the lid and test sample is measured to 0.01 gram accuracy. The jars are placed into a 22±1° C., 50±2% relative humidity environmental chamber (Blue M, Model o. FR-361C-1). The weight of the desiccant filled jars and samples are measured every 12 hours for four days.

Calculate the MVTR based on the following formula:

To analyze the data, a linear regression, in grams of water gain/day, is then divided by the area of the sample, area in meters squared=0.0031669, to give the MVTR in g/day-m². This was performed on each sample and the average MVTR of the two samples was recorded as the overall MVTR for that material. The MVTR of the vapor permeable layer of the instant invention is at a minimum of 20 g/24 hrs·m².

(2) Test Procedure for Determining the Gurley Number

The Gurley air flow test measures the time in seconds for 100 cc of air to flow through a 6.34 square cm (one square inch) sample at 12.4 cm (4.88 inches) of water pressure. The sample is measured in a Gurley Densometer, manufacture by Teledyne Gurley, model number 4110. The Gurley Densometer has been modified with two 2.54 cm pneumatic cylinders set with 6.21 bar air pressure that clamp the orifice plates together. The sample is placed between the clamping orifice plates and air pressure is applied to clamp the sample between the plates. The cylinder is then dropped gently. The automatic timer, manufacture by Teledyne Gurley, model number 4320 is used to record the time (seconds) required for a specific volume recited above to be displaced by the cylinder. This time in seconds is the Gurley number. The Gurley number of the air-impermeable layer of the instant invention is greater than 1000 seconds.

(3) Bubble Point Test

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The Bubble Point is measured using the procedures of ASTM F316-86 as guideline. Isopropanol was used as the wetting fluid to fill the pores of the test specimen. The test sample was placed in a filter holder (Millipore corporation, catalog number XX50-047-10), covered with a support screen and the locking ring of the holder attached. The top of the holder is then filled with isopropanol, and the holder is attached to an air supply with a regulated control valve. The holder is placed under a magnifying lens with a light and the air pressure is increased until a continuous stream of bubbles is visually seen coming through the support screen covered with isopropanol.

The Bubble Point is the pressure of air required to displace the isopropanol from the largest pores of the test specimen and create the first continuous stream of bubbles detectable by their rise through a layer of isopropanol covering the porous media. This measurement provides an estimation of maximum pore size.

(4) Thickness

Thickness was determined using a Mitutoyo Snap Gauge Tester, model 7326, Series 7 with 1 square cm sample test area.

(5) Water Entry Pressure (WEP)

Water entry pressure provides a test method for water intrusion through membranes. A test sample is clamped between a pair of testing plates. The lower plate has the ability to pressurize a section of the sample with water. A piece of pH paper is placed on top of the sample between the plate on the nonpressurized side as an indicator of evidence for water entry. The sample is then pressurized in small increments, waiting 10 seconds after each pressure change until a color change in the pH paper indicates the first sign of water entry. The water pressure at breakthrough or entry is recorded as the Water Entry Pressure. The test results are taken from the center of test sample to avoid erroneous results that may occur from damaged edges.

6) Humidity Test for Testing Moisture Reducing Devices

An enclosure, such as a headlamp housing, is checked for leaks prior to testing by drilling a hole in the enclosure, inserting a port and sealing the port with sealant, manufactured by Dow Corning, part number RTV 734. Then, any area that would normally be closed with a moisture reducing device or heat source, such as a headlamp bulb, is sealed with a sealant. The enclosure is connected to a regulated air line through the attached port and the enclosure is pressurized to 3.45×10$^{-2}$ bar and totally submerged in water for one minute. If any leaks are observed by the observation of bubbles of air leaking from the enclosure they are sealed with Dow Corning 734 flowable Sealant or 732 Heat Resistant Sealant and retest until no leaks are observed.

The enclosure is then dried, the ports opened and placed in an environmental chamber at 22° C. and 50% relative humidity (RH) for a minimum of 48 hours. The enclosures' ports and opening, such as bulb sockets in the case of a headlamp, are oriented so that they are facing the chamber's air flow. After the preconditioning the lamp housings, the bulb and the device for 48 hours, the bulbs are installed and the device of the invention are installed, as necessary.

Each enclosure is then placed in an environmental chamber oriented in its design operating position at 38° (+4°/−0°) C. and 90% (+5%/−0%) RH. The bulb adjacent to the device in each enclosure is then energized at the specified design voltage for 1 hour "on" and 2 hours "off" for 72 hours. At the end of 72 hours the enclosure is removed from the environmental chamber and placed on a lab bench in the design operating position and a timer is started. Each enclosure was observed at the end of one hour for the presence of any moisture visible without the aid of magnification. The term "moisture" as pertaining to this test is the presence of condensation in the form of a fog or water droplets on the interior surfaces or in the bottom of the enclosure.

If moisture is present in the enclosure, as evidenced by visual condensation, the test is recorded as a failure. Conversely, if no moisture is observed, the test is recorded as a pass.

Without intending to limit the scope of the present invention, the following examples illustrate how the present invention may be made and used:

EXAMPLE 1
Production of Silicone Rubber Imbibed ePTFE Membrane

A roll of tensilized polytetrafluoroethylene (PTFE) tape, manufacture by DeWal Industries of Sanderstown, R.I., part number 220T, that is approximately 20 cm wide is placed on the payoff of a draw down machine, passed over a steel guide, attached to clamp connected to a drive motor, then pulled onto the working surface of the machine and kept under tension by the drive motor and payoff. A draw down blade having center section machined out wherein there is a 76 μm clearance over the surface of the PTFE tape when the pneumatic cylinders push the draw down blade so that the edges of the draw down blade contact the working surface. Approximately 100 grams of silicone rubber, manufactured by General Electric Company of Pittsfield, Mass., part number RTV 863, is placed on the PTFE tape between the idler roll and draw down blade. The motor is started and the PTFE tape is pulled under the drawdown blade at a rate of approximately 8 cm/s, applying a thin coating of the silicone rubber. After pulling approximately 80 cm of the PTFE tape, the motor is stopped and a piece of ePTFE membrane, manufactured by W. L. Gore & Associates Inc. of Elkton, Md., is carefully laid down on the newly metered silicone rubber surface being careful to prevent air bubbles and wrinkles from forming between the silicone rubber and the ePTFE membrane. The ePTFE membrane that is used for the silicone imbibing has the following properties: isopropanol (IPA) bubble point 0.60–0.86 bar, thickness 0.064–0.089 mm, water entry pressure (WEP) minimum of 1.38 bar and is filled with 7.5% by weight of carbon black.

The silicone rubber imbibed ePTFE composite is then placed into a conventional oven at 150° C. for 3 to 5 minutes. After cooling the ePTFE membrane, the silicone rubber composite is cut to the appropriate size, as described below.

A Moisture Reducing Device

A housing of a moisture reducing device is produced as depicted in FIGS. 1A, 1B and 1C consisting of polyetherimide box sold by the trade name Ultem®100, manufactured by General Electric Company of Pittsfield, Mass., and made by either injection molding or machining wherein the diffusion tube or cannel is machined or formed by the injection mold. A thin laminate of silicone coated polyester film, manufactured by FLEXcon® Company Inc. of Spencer, Mass., part number FLEXmark® 200 Poly H-9 Liner, and an adhesive comprising a polyester carrier having silicone pressure sensitive adhesive on both sides, with a hole centered at the entrance hole of the diffusion tube is then inserted into the device with the PSA/FLEXmark laminate separating the desiccant from the diffusion tube.

An ePTFE membrane side vent layer, manufactured by W. L. Gore & Associates Inc. of Elkton, Md. (density of 0.97 g/cc, Gurley Number of 21 seconds; thickness of 0.18 mm, water entry pressure of 1 bar), is heat sealed to cover the opening that communicated with the desiccant and interior of the enclosure. The heat sealing is accomplished by aluminum, circular sealing die with the dimensions of 6.35 mm outside diameter (O.D). and 2.54 mm inside diameter (I.D.). The heat sealing conditions that seal the ePTFE membrane layer to the device consist of the die at 370° C., with 1.72 bar applied pressure for 2 seconds. The sealing die is controlled to stop 1 mm into the edge of the moisture reducing device housing.

The moisture reducing device is then filled with 0.600±0.005 grams of Type B silica desiccant manufactured by Kaltron Inc. (Kaltron|Pettibone) of Bensenville, Ill., part number Sil 66300.

A piece of silicone imbibed ePTFE composite, as described above, measuring about 25×14 cm is heat sealed to the opening of the device to contain the desiccant, with the imbibed ePTFE membrane layer facing the opening of the box and the tensilized PTFE tape facing upward. The heat sealing conditions that seal the silicone imbibed ePTFE membrane layer to the device consist of the die at 370° C., with 1.72 bar applied pressure for 3 seconds. The sealing die is controlled to stop 1 mm into the edge of the moisture reducing device housing. After the heat sealing, the tensilized PTFE tape is removed and any excess imbibed silicone ePTFE membrane layer is carefully removed.

The moisture reducing device was tested using Test Method 6 (Humidity Test for Testing Moisture Reducing Devices) by mounting in a Model Year 2000 Chevy Silverado Headlamp and passed. The control consisting of vent laminate manufactured by W. L. Gore & Associates Inc. of Elkton, Md., part number VE0189GMC, failed the Humidity Test Method 6.

EXAMPLE 2

A moisture reducing device with an air-impermeable, water vapor permeable perfluorosulfonic acid ionomer layer.

A housing of a moisture reducing device is produced as in Example 1, except that an air-impermeable, water vapor permeable layer comprised a perfluorosulfonic acid ionomer layer, manufactured by E. I. Du Pont de Nemours & Company of Wilmington, Del., and sold under the trademark Nafion® membrane, part number 105H+ is heat sealed to cover the opening that communicates with the desiccant and interior of the enclosure.

The perfluorosulfonic acid ionomer layer is heat sealed to the device with a heated anvil at 370° C. with a pressure of 3.45 bar for 3.5 seconds. The heat sealing anvil is controlled to stop 1 mm below the edge of the moisture reducing device housing.

EXAMPLE 3

A moisture reducing device with an air-impermeable, water vapor permeable layer consisting of a Teflon® AF coated or imbibed ePTFE membrane was made in the following manner. The ePTFE membrane used for the silicone imbibing had the following properties: isopropanol (IPA) bubble point 1.00–1.50 bar, thickness 0.069–0.102 mm, water entry pressure (WEP) minimum of 2.76 bar.

A housing of a moisture reducing device is produced as in Example 1 except that the air-impermeable, water vapor permeable layer is a Teflon® AF imbibed GORE-TEX membrane, the Teflon AF manufactured by E. I. Du Pont de Nemours & Company of Wilmington, Del., part number 2400. The Teflon AF air-impermeable, water vapor permeable layer is manufactured as taught by the method in U.S. Pat. No. 5,116,650 except the membrane is continually coated until the membrane is air-impermeable, usually three or more coatings. The Teflon AF imbibed GORE-TEX membrane layer is sealed to cover the opening that communicated with the desiccant and interior of the headlamp enclosure.

The Teflon AF imbibed GORE-TEX membrane layer is placed upward and the layer is heat sealed to the device with a heated anvil at 380° C. with a pressure of 3.45 bar for 3.5 seconds. The heat sealing anvil is controlled to stop 1 mm below the edge of the device housing.

EXAMPLE 4

A Moisture Reducing Device Attached to a Bulb Shield

A box was machined from polyetherimide sold under the trade name ULTEM 1000, polyethenimide manufactured by General Electric Company of Pittsfield, Mass., see FIG. 4B.

A stainless steel tube, manufactured by Upchurch Scientific, Inc., of Oak Harbor, Wash., part number U-107 with an I.D. of 0.762 mm and O.D. of 1.524 mm way cut to the length of approximately 60 mm and bent into an "L" shape. Another piece of the aforementioned tube was cut to 150 mm in length and bent into a coil measuring 20 mm in diameter.

The Ultem box was then filled with 0.600±0.005 grams of Type B silica desiccant manufactured by Kaltron Inc. (Kaltron|Pettibone) of Bensenville, Ill. part number Sil 66300.

A piece of silicone imbibed ePTFE composite as describe in Example 1, was then heat sealed to the opening of the moisture reducing device to contain the desiccant, with the silicone imbibed ePTFE membrane facing the opening of the box and the tensilized PTFE tape facing outward. The silicone imbibed ePTFE composite was heat sealed to the device with a heat anvil at 370° C. with a pressure of 1.7 bar for 3 seconds. The heat sealing anvil was controlled to stop 1–2 mm below the rim of the moisture reducing device. After the heat sealing the tensilized PTFE tape was removed and any excess imbibed silicone ePTFE membrane is carefully removed.

The coiled tube was fitted into the inside surface of the bulb shield of a 1999 Mercury Villager head lamp. One end of tube was bent to extend up to the stem of the bulb shield. The tube was then inserted into the Ultem box and glued together with silicone adhesive, manufactured by Dow Corning Company of Midland, Mich., part number RTV 743. The Ultem box was glued onto the stem of the bulb shield using silicone adhesive, manufactured by Dow Corning Company, part number RTV 743. The bulb shield was then installed into a 1999 Mercury Villager head lamp.

A 1.59 mm diameter hole was drilled in a 1999 Mercury Villager head lamp. The "L" shaped stainless steel tube was then inserted into the Ultem box and the other end extending through the hole in the top of the lamp. The plastic headlight lens was reattached and all connections were glued using silicone adhesive, manufactured by Dow Corning Company, part number RTV 743.

EXAMPLE 5

Production of Silicone Rubber Imbibed ePTFE Tubing

A length of ePTFE tubing (available from W. L. Gore & Associates, Inc. as Part No. RTR-5B-0004) was cut and placed in a tank for 5 minutes containing the following imbibing mixture: Silicone RTV adhesive, manufactured by General Electric Company of Pittsfield, Mass., part number RTV-863, containing a platinum catalyst in the ratio of 10:1 and a Isopar C, sold by the Exxon Company, in the ratio of 3:1. After five minutes the tubing was removed from the tank and run through a sizing die and then hung in a hot air oven at 150° C. for approximately one hour.

The metal support structure from a Sylvania 9006 HB4U (51 Watt) bulb (GTE Sylvania) was removed. The plastic cover used to protect the electric connectors was removed and a 1.58 mm diameter hole was drilled through the back of the bulb socket into the interior of the bulb area.

A piece of the tubing described above measuring approximately 65 mm in length was heat sealed on one end as described in U.S. Pat. No. 4,830,643 using the following conditions: temperature 400° C., at 2.07 bar for 3 seconds.

A stainless steel tube, manufactured by Upchurch Scientific, Inc., part number U-107 with an I.D. of 0.762 mm and O.D. of 1.524 mm is cut to the length of 110 mm and bent into a tight "S" with 65 mm on one side of the "S" bend.

Figure 5B:
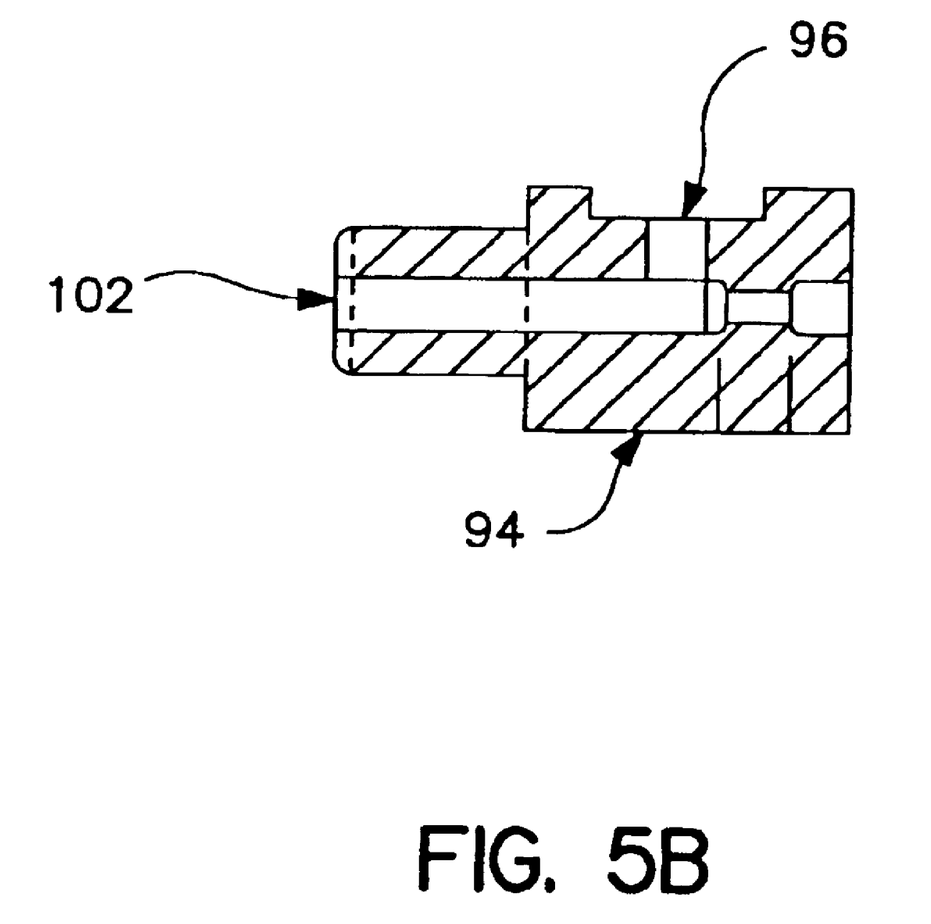
FIG. 5B is a side cross-sectional view of the connector for the moisture reducing device of FIG. 5A.

The moisture reducing device connector was machined from a solid piece of polyetherimide, sold as Ultem 101, manufactured by General Electric Company, see FIG. 5B. A 6 mm×8 mm piece of vent laminate manufactured by W. L. Gore & Associates Inc. of Elkton, Md., part number VE0001AUD, was heat sealed to the condensation prevention device connector using an circular aluminum die, at 270° C. with a pressure of 1.72 bar for 3 seconds. The moisture reducing device connector is then slipped over the 65 mm end of the stainless steel diffusion tube up to the "S" bend.

The silicone imbibed ePTFE tube was filled with 0.53 grams of Type B desiccant, manufactured by Kaltron/Pettibone, part number Sil 66300. A 7 mm stepless Oetiker clamp, manufactured by Oetiker of Livingston, N.J., was then used to attach the desiccant filled tube by crimping the Oetiker clamp to the moisture reducing device connector.

The commercial spike from a 1994 Grand Marquis head lamp was removed and the vent hole plugged with silicone adhesive, manufactured by Dow Corning, part number RTV 736 red silicone.

EXAMPLE 6

A Moisture Reducing Device Integrated into Spike Vent

A commercial head light connector, Ford part number E9WY-13C126-A is modified by drilling a 0.508 mm hole through the connector, see FIG. 6.

A piece of GORE-TEX tubing approximately 65 mm in length, manufacture by W. L. Gore & Associates Inc., of Elkton, Md., part number RTR5B-0004, was imbibed as described in Example 5. One end of the imbibed tube is heat sealed as described in U.S. Pat. No. 4,830,643 using the following conditions: temperature 400° C., at 2.07 bar for 3 seconds. The connector was inserted into the other end of the imbibed tubing and sealed with RTV adhesive, manufactured by Dow Corning Company, part number RTV-736. The silicone imbibed tubing was filled with approximately 0.6 grams of Type B silica desiccant, manufacture by Kaltron/Pettibone, part number Sil 66300.

A stainless steel tube, manufactured by Upchurch Scientific, Inc., part number U-107 with an I.D. of 0.762 mm and O.D. of 1.524 mm was cut to the length of 72 mm. A plug for the stainless steel tube was made from a red silicone sheet, purchased from McMaster Carr Company of Dayton, N.J., part number 8632K44, having the following dimensions: 6.35 mm in diameter, 3 mm thick and having a 1.524 mm center hole. The stainless steel tube was inserted onto the center hole of the plug and positioned approximately 20 mm from one end of the tube. The stainless steel tube with the attached silicone plug was inserted into the desiccant filled silicone imbibed ePTFE tube and glued into the connector with silicone adhesive, manufacture by Dow Corning Company, part number RTV 743.

A 5 mm hole was drilled through the center of the plastic end cap of the connector and the other tubular end of the connector was sealed with epoxy adhesive. An OLEOGARD® adhesive vent manufactured by W. L. Gore & Associates Inc., of Elkton, Md., part number VE0004WAG was installed over the 5 mm hole in the connector cap.

The hole from which the commercial spike was removed was drilled out to an 8 mm diameter and the moisture reduction device is installed. The moisture reducing device was tested using Test Method 6 (Humidity Test for Testing Moisture Reducing Devices) by being mounted in a 1994 Mercury Grand Marquis (Ford Motor Corporation, Detroit, Mich.) headlamp and passed. The control consisted of a vent laminate manufactured by W. L. Gore & Associates Inc. of Elkton, Md., part number VE0018GMC, which failed the Humidity Test Method 6.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A device for reducing the presence of moisture within an enclosure including a heat source comprising:
   a) a housing containing desiccant;
   b) an air-impermeable and water vapor permeable layer incorporated with said housing and oriented adjacent said heat source;
   c) a vent hole in the device providing a pathway from inside the enclosure to the desiccant;
   d) a diffusion tube having a first opening adjacent to said desiccant and a second opening adjacent to the atmosphere external to the housing, said diffusion tube creating a pathway from the desiccant in the interior of the housing to the external atmosphere; and
   e) a means for locating said housing so that the heat source can heat the desiccant to a temperature whereby the moisture is driven from the desiccant.

2. A moisture reducing device of claim 1 wherein the air-impermeable layer has a Gurley number of greater than 1000 seconds.

3. A moisture reducing device of claim 1 wherein the vapor permeable layer as defined by a moisture vapor transmission rate (MVTR), as defined by test method 1, is at a minimum of 20 g/24 hrs·m².

4. A moisture reducing device of claim 1 wherein the desiccant is selected from the group consisting of silica gel and molecular sieves.

5. A moisture reducing device of claim 1 wherein the diffusion tube comprises a channel located in the housing with a hole at one end for a pathway from the exterior atmosphere and an air-impermeable adhesive having a hole oriented at the other end of the channel connecting the desiccant with the interior of the enclosure, said adhesive separating the desiccant from the channel.

6. A moisture reducing device of claim 1 wherein the diffusion tube comprises a channel located in the housing with a hole at one end for a pathway from the exterior atmosphere and an air-impermeable laminate with an adhesive having a hole oriented at the other end of the channel connecting the desiccant with the interior of the enclosure, said laminate separating the desiccant from the channel.

7. A moisture reducing device of claim 1 wherein the diffusion tube comprises a channel located in the housing with a hole at one end for a pathway from the exterior atmosphere and an air-impermeable divider having a hole oriented at the other end of the channel connecting the desiccant with the interior of the enclosure, said divider separating the desiccant from the channel.

8. A moisture reducing device of claim 1 wherein the diffusion tube comprises a channel cut through multiple layers located in or on the housing with a hole at one end for a pathway from the exterior atmosphere and an air-impermeable layer having a hole oriented at the other end of the channel connecting the desiccant with the interior of the enclosure, said air-impermeable layer separating the desiccant from the channel.

9. A moisture reducing device of claim 1 wherein the diffusion tube is comprised of a tube located in the housing with a hole at one end for a pathway from the exterior atmosphere and a hole oriented at the other end of the channel connecting the desiccant with the interior of the enclosure.

10. A moisture reducing device of claim 1 further comprising a membrane comprising expanded PTFE covering the first opening.

11. A moisture reducing device of claim 1 further comprising an oleophobic ePTFE membrane covering the second opening.

12. A moisture reducing device of claim 11 wherein the oleophobic membrane covering the second opening is selected from the group consisting of an oleophobic modified acrylic copolymer membrane and of an oleophobic modified polyvinylidene fluoride membrane.

13. A moisture reducing device of claim 1 wherein the air-impermeable, water vapor permeable layer comprises a silicone imbibed, expanded polytetrafluoroethylene (ePTFE) membrane.

14. A moisture reducing device of claim 1 wherein the air-impermeable, water vapor permeable layer comprises a silicone imbibed ePTFE tube.

15. A moisture reducing device of claim 13 wherein the silicone-imbibed ePTFE membrane incorporates filler selected from the group consisting of carbon, carbon black, graphite, charcoal and black iron oxide.

16. A moisture reducing device of claim 14 wherein the silicone-imbibed ePTFE tube incorporates a filler selected from the group consisting of carbon, carbon black, graphite, charcoal and black iron oxide.

17. A moisture reducing device of claim 1 wherein the air-impermeable, water vapor permeable layer is a polyurethane imbibed ePTFE membrane.

18. A moisture reducing device of claim 1 wherein the air-impermeable, water vapor permeable layer is a perfluorosulfonic acid ionomomer membrane.

19. A moisture reducing device of claim 1 wherein the air-impermeable, water vapor permeable layer comprises a polyurethane-imbibed ePTFE tube.

20. A moisture reducing device of claim 1 wherein the air-impermeable, water vapor permeable layer comprises a perfluorosulfonic ionomer tube.

21. A moisture reducing device of claim 19 wherein the polyurethane-imbibed ePTE tube incorporates a filler selected from the group consisting of carbon, carbon black, graphite, charcoal and black iron oxide.

22. A moisture reducing device of claim 20 wherein the perfluorosulfonic ionomer tube incorporates a filler selected from the group consisting of carbon, carbon black, graphite, charcoal and black iron oxide.

23. A moisture reducing device of claim 1 wherein said device is attached within the enclosure by at least one means selected from the group consisting of adhesive bonding, sonic welding, insert molding, thermal bonding and mechanical means.

24. A device for reducing the presence of moisture within an enclosure including a heat source comprising:
   a) a housing containing silica gel desiccant;
   b) an air-impermeable and water vapor permeable layer comprising silicone imbibed expanded polytetrafluoroethylene membrane incorporated with said housing on a side adjacent said heat source;
   c) a vent hole in the side of the said device providing a pathway from inside the enclosure to the desiccant, said vent hole covered with a hydrophobic, air-permeable expanded polytetrafluoroethylene layer;
   d) a diffusion tube having a first opening adjacent to said desiccant and a second opening adjacent to the atmosphere external to the housing, said diffusion tube creating a pathway from the desiccant in the interior of the housing to the external atmosphere and having an expanded polytetrafluoroethylene layer covering the opening to the external atmosphere;
   e) a mechanical means for locating said housing adjacent the heat source.

25. A device for reducing the presence of moisture within an enclosure including a heat source comprising:
   a) an air-impermeable, water vapor-permeable silicone-imbibed expanded polytetrafluoroethylene tube, said tube oriented adjacent said heat source;
   b) a connector for said tube with a vent hole in the side of the connector providing a pathway from inside the enclosure to the desiccant, said vent hole covered by a hydrophobic, air-permeable expanded polytetrafluoroethylene layer;
   c) a diffusion tube having a first opening adjacent to said desiccant and a second opening adjacent to the atmosphere external to the connector, said diffusion tube creating a pathway from the desiccant in the interior of the tube to the external atmosphere and having an expanded polytetrafluoroethylene layer covering the opening to the external atmosphere;
   d) a mechanical means for locating said tube and connector adjacent the heat source whereby the heat source can heat the desiccant to drive moisture from the desiccant.

* * * * *